(12) United States Patent
Muramatsu et al.

(10) Patent No.: US 6,280,647 B1
(45) Date of Patent: Aug. 28, 2001

(54) METHOD FOR SHARPENING A PROBE

(75) Inventors: Hiroshi Muramatsu; Katsunori Honma; Norio Chiba; Noritaka Yamamoto; Akira Egawa, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/310,268

(22) Filed: May 12, 1999

(30) Foreign Application Priority Data

May 13, 1998 (JP) .................................................. 10-130249
Sep. 9, 1998 (JP) .................................................. 10-255270

(51) Int. Cl.[7] ....................................................... B44C 1/22
(52) U.S. Cl. ............................... 216/92; 216/11; 216/97; 216/100
(58) Field of Search ................................. 216/11, 92, 97, 216/100

(56) References Cited

U.S. PATENT DOCUMENTS

| 4,469,554 | * | 9/1984 | Turner | 156/657 |
| 5,709,803 | * | 1/1998 | Filas et al. | 216/11 |
| 5,772,903 | * | 6/1998 | Hirsch | 216/11 |
| 5,800,666 | * | 9/1998 | Bonham, Jr. et al. | 216/11 |
| 5,985,166 | * | 11/1999 | Unger et al. | 216/11 |
| 6,030,542 | * | 2/2000 | Koide et al. | 216/92 |

FOREIGN PATENT DOCUMENTS

| 7159113 | | 6/1995 | (JP) . |
| 7-159113 | * | 6/1995 | (JP) . |
| 7-218516 | * | 8/1995 | (JP) . |
| 7218516 | | 8/1995 | (JP) . |
| 10104244 | | 4/1998 | (JP) . |
| 10-104244 | * | 4/1998 | (JP) . |
| 293515 A | * | 8/1975 | (SU) . |

* cited by examiner

*Primary Examiner*—Randy Gulakowski
*Assistant Examiner*—Michael Kornakov
(74) *Attorney, Agent, or Firm*—Adams & Wilks

(57) ABSTRACT

In a method for sharpening a probe, a probe preform having a longitudinal axis is at least partially immersed in a mixture containing at least an etch solution and a non-etch solution having a lower specific gravity than and which is not miscible with the etch solution. The probe preform is moved in the mixture along the longitudinal axis thereof during etching at a speed which does not exceed a taper length forming speed for a probe preform which is not moved in the etch solution during etching. An end of the probe preform is etched into a sharp tapered tip having a taper angle greater than that obtained for the probe preform which is not moved during etching.

27 Claims, 5 Drawing Sheets

F I G. 1
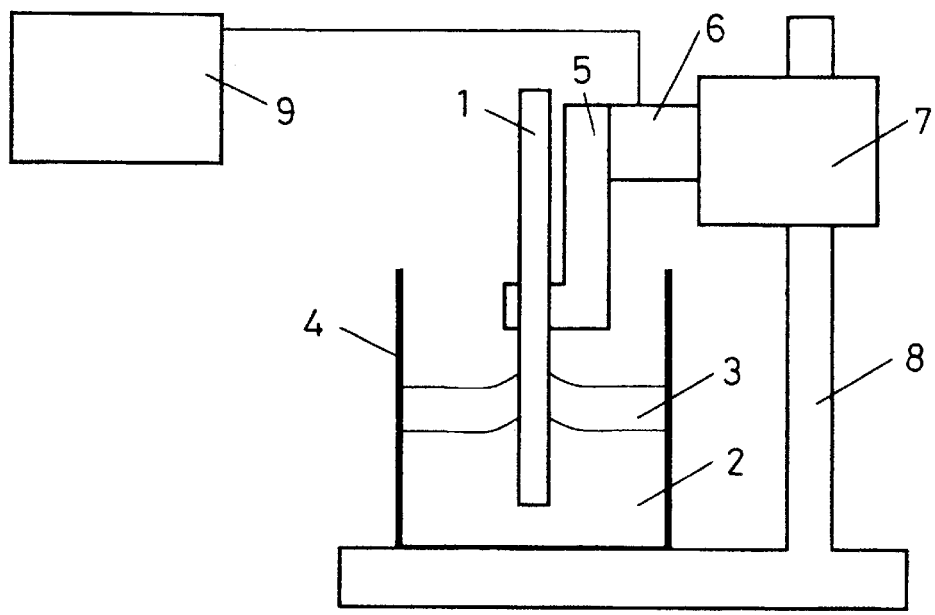
F I G. 2A
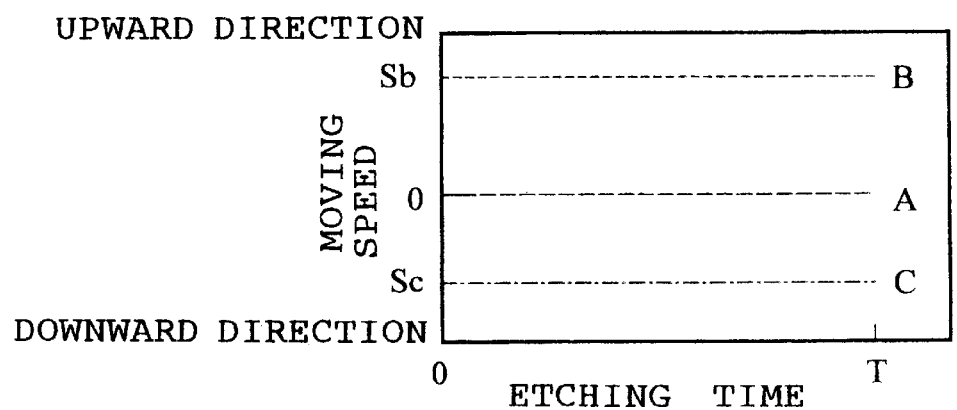
F I G. 2B 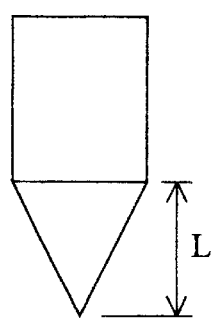
F I G. 2C 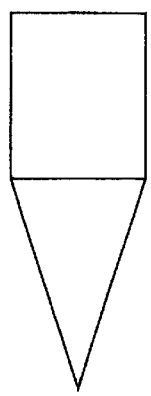
F I G. 2D 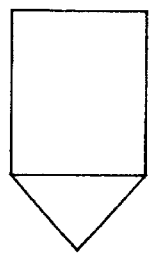

FIG. 5A   FIG. 5B   FIG. 5C
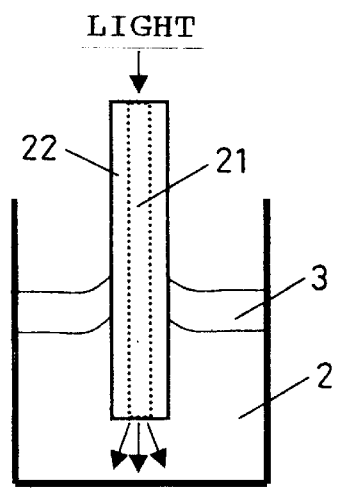
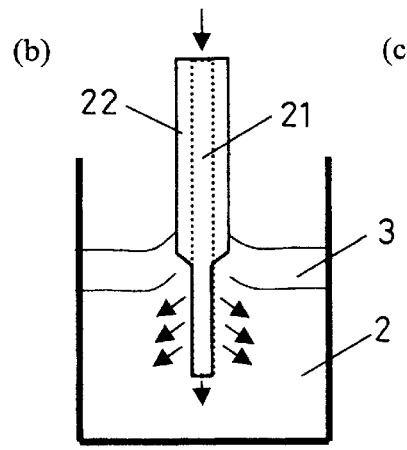
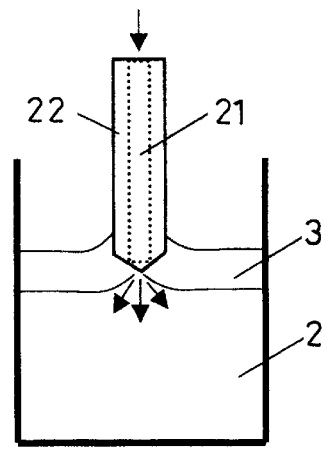
FIG. 6
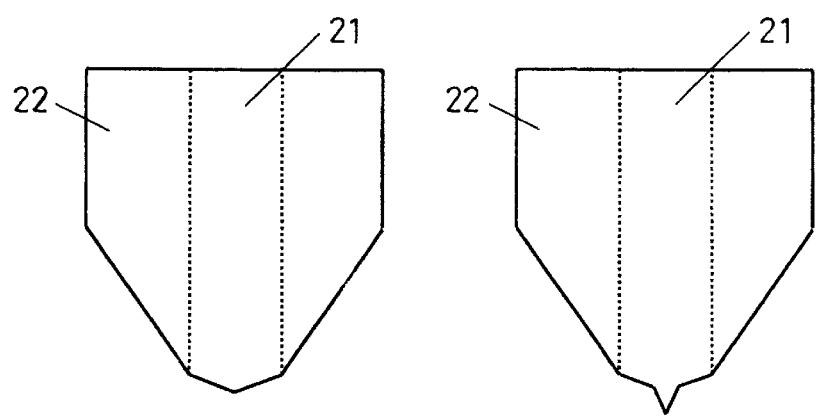

METHOD FOR SHARPENING A PROBE

BACKGROUND OF THE INVENTION

The present invention relates to a tip sharpening method as a probe manufacturing method usable for tunnel microscopes (STM), atomic force microscopes (AfM) and scanning proximity field optical microscopes (SNOM).

Conventionally, for usage in Sm and AFM there has been a demand for probes having a sharp form which is small in tip diameter and angle in order to obtain high resolution. On the other hand, in SNOM there has been a demand for a tip which is large in taper angle in order to improve the optical throughput at the probe tip. An interface etch method is utilized for sharpening an STM probe, while a method is used for an AFM probe that a sharp tip is formed by side etching effected under an on-silicon mask pattern. An optical fiber thermal drawing method and an etch method are used for a SNOM probe. In particular, the etch method includes a method to form a predetermined tip form by changing the composition of an etch solution and utilizing a difference in etch rate between the optical fiber core and the clad and a method developed by Turner et al. U.S. Pat. No. 4,469,554, 1984) to form a sharpened tip in an interface of two liquid layers wherein an organic liquid is placed on a hydrogen fluoride solution.

Each of the sharpening methods so far has been basically limited to a large extent in controlling the tip angle. For example, the optical fiber thermal drawing method has somewhat allows reduction or the tip angle but it is difficult to increase the tip angle and decrease the tip diameter according to that method. With the etch method, it is difficult to change the tip form without largely changing the etch condition including changing the probe material composition or the etch solution or etch gas composition. Also, according to the two-layer etch method a change in the taper angle is possible by changing the type of organic solvent. However, it is difficult to change the taper angle largely or obtain an arbitrary taper form. For this reason, the present invention provides a probe sharpening method capable of forming an arbitrary taper angle of a probe tip.

SUMMARY OF THE INVENTION

A probe preform (hereinafter "probe material") is partly immersed in a liquid disposed in a container and having at least two layers including an etch solution for the probe and a non-etch solution that is lower in specific gravity than the etch solution and immiscible therewith when the probe material is etched to sharpen its tip, the probe material is slightly moved vertically (i.e., in height position) during etching. In this manner, a probe sharpening method was devised by which a tip taper form can be formed with an arbitrary angle.

BRIEF DESCRIPTION OF THE DRAWINGS

FIG. 1 is a typical view showing a structure of a jig used in a probe sharpening method of the present invention;

FIGS. 2A–2O are typical views of a probe moving speed and a probe tip form to be fabricated;

FIGS. 5A–5C are explanatory views of emission light from an optical fiber in an optical fiber sharpening method of the present invention;

FIGS. 6A–6B are typical views of optical fiber probe tip forms to be fabricated;

DETAILED DESCRIPTION OF THE PREFERRED EMBODIMENTS

Figure 3A:
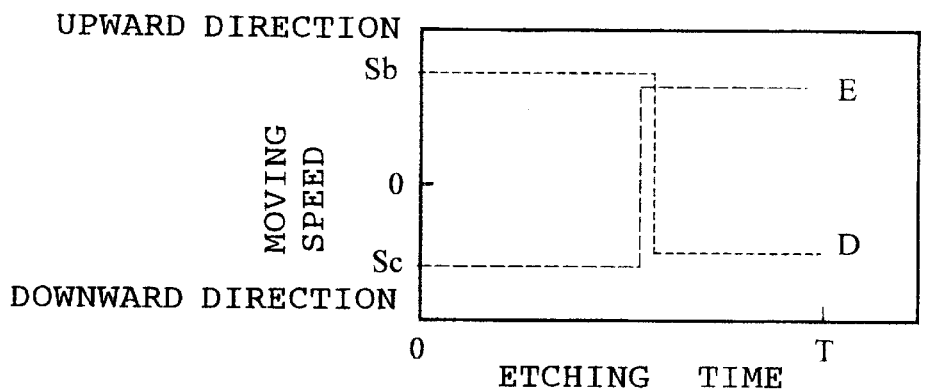
FIGS. 3A–3C are typical views of a probe moving speed and a probe tip form to be fabricated.

Now an embodiment of the present invention will be described with reference to the drawings.

FIG. 1 shows a typical jig structure used in a method for sharpening a probe according to the present invention. In FIG. 1, a probe perform (hereinafter "probe material")1 is partly immersed in a liquid having at least two layers contained in a vessel 4, including an etch solution 2 for the probe material and a non-etch solution 3 having a specific gravity smaller than the etch solution 2 and which is immiscible therewith. A probe-material fixing member 5 is secured to a fine movement element 6 that is movable vertically with respect to a liquid surface. This fine movement element 6 is fixed to a support member 8 through a rough movement mechanism 7 that is movable vertically with respect to the liquid surface. Further, the fine movement element 6 is connected to a fine movement element control means 9 so that the probe material 1 can be finely moved vertically (i.e., along its height), during etching. Here, the probe material 1 is cylindrical in form. It is preferred that its center axis is vertically immersed with respect to the etch solution surface.

Here, the fine movement element 6 may use, specifically, a piezoelectric actuator. The range of its displacement can be selected from several microns, if using a displacement magnifying mechanism, up to about several hundreds micron. The fine movement control means 9 is configured by an amplifying circuit for voltage application and a voltage setting circuit. The voltage setting circuit, if configured by a computer and a D/A converting circuit, can precisely control the fine movement element.

Now described is an embodiment of a method for sharpening a probe. First, a case is explained where a fine movement is conducted continously.

FIG. 2A shows a probe movement speed, wherein A represent a speed 0 or a stationary state, B is a case in which the probe material is moved upward at a constant speed Sb, and C is a case in which the probe material is moved downward at a constant speed Sc. Here, T shows a time during which all of the probe material in the etch solution is dissolved and it is expressed as T=R/V, where a radius is denoted as R and an etch rate on the probe material is denoted as V. First, in the case of the speed 0, the meniscus at an interface between the etch solution and the non-etch solution moves as the etch process proceeds, as disclosed by Turner et al. Consequently, a sharpened form as shown in FIG. 2B is obtainable. The height L of a taper portion in this case is determined by the viscosities of the etch and non-etch solutions and the magnitude of polarity. FIG. 2C shows a tip form obtained when the probe material is moved upward at the speed Sb. In this case, because the probe material is gradually pulled up from the meniscus position, a tip form finally obtained is long in taper length with a sharp tip angle. FIG. 2D shows a result obtained when the probe material is moved downward at the speed Sc.

In this case, Sc shows a result of a case in which a taper length forming speed (L/T) at a moving speed zero is not exceeded provided that Sc is Sc<L/T. In this case, a tip form that is short in taper length with a large tip angle is obtained. Stated otherwise, according to the present invention, a probe tip is obtained which has a larger taper angle than that obtained when the probe material is not moved (i.e., at a zero speed) in the etch solution during etching. This is accomplished by moving the probe material downward at a speed that does not exceed the taper length forming speed (L/T) for the case where the probe material is not moved during etching.

Figure 3B:
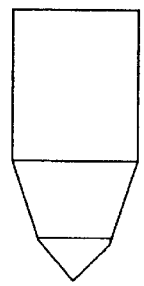
Figure 3C:
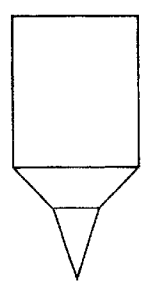

Next, explained is an embodiment wherein the moving speed in fine movement operation is varied. By way of examples, as shown in FIG. 3A, demonstrated are a case D in which the probe material is first moved upward and then downward, and a case E in which the probe material is first moved downward and then upward. A result of the case D is shown in FIG. 3B. In this case, a form is obtained where the taper angle is small on a taper outer side and large in a taper center portion. Further, a result of the case E is shown in FIG. 3C. In this case, a form is obtained where the taper angle is large on a taper outer side and small in a center portion. Because the speed can be changed an arbitrary number of times, an arbitrary taper form can be formed. Besides such stepwise speed change as above, a curve-lined taper form can be created by changing the speed in a continuous fashion.

Here, details of the probe material, etch solution and non-etch solution are described. If the probe material is a metal such as platinum, gold or tungsten, the etch solution i-s selectable from chemical substances of acids including hydrogen fluoride, sulfuric acid, nitric acid, hydrochloric acid, aqua regia, hydroxides including potassium hydroxide and sodium hydroxide, and further iodine and iodides (potassium iodide, etc.). The non-etch solution, in this case, is selectable from mineral oil, vegetable oil, synthetic chemical oil, and so on, besides organic solvents including hexane, heptane and octane.

The etch solution, if the probe-material is glass, may be either of a hydrogen fluoride solution or a mixture solution of fluorine and ammonium fluoride. The non-etch solution may be any of organic solvent, mineral oil, vegetable oil or synthetic chemical oil.

If the probe material is a plastic such as poly methyl methacrylate (PMMA), the etch solution may be aromatic hydrocarbon, hydrocarbon halide or a mixture of a hydrophobic liquid containing aromatic hydrocarbon and hydrocarbon halide, which is a liquid having a specific gravity greater than that of water at a same temperature. The non-etch solution many be water or a solution.

On the other hand, if the probe material is an optical fiber, a glass etch method is basically applicable. However, the following method enables accurate control for a tip form of a core portion.

Figure 4:
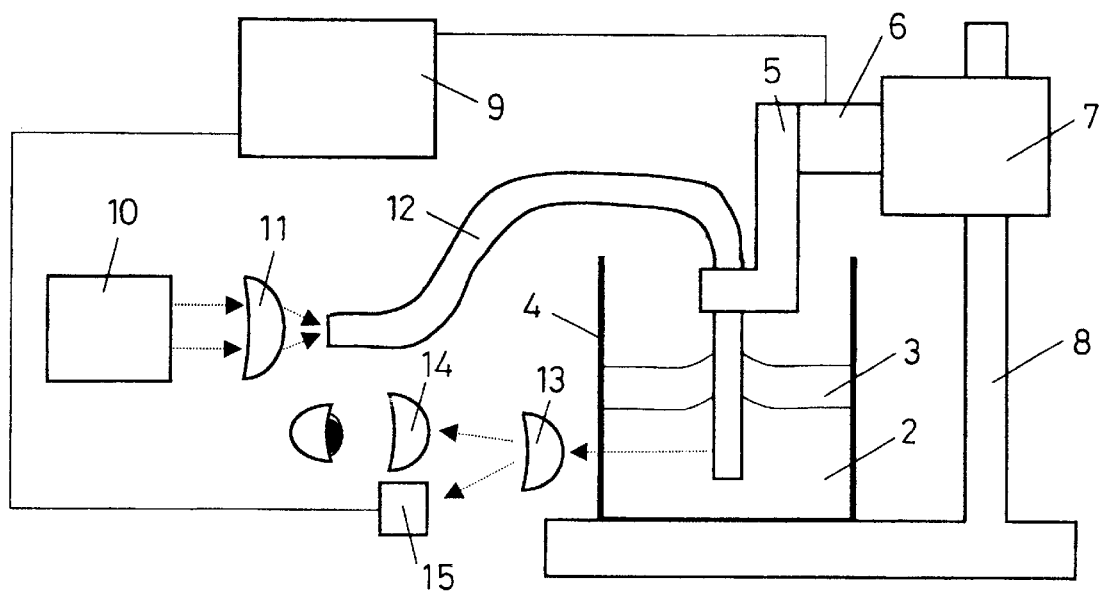
FIG. 4 is a typical view showing a structure of a jig used in the probe sharpening method of the present invention.

FIG. 4 shows a typical structure of a jig for etching an optical fibers The structure of FIG. 4 is different from that of FIG. 1 in that a light source 10 and a focusing lens 11 are provided to introduce light to an optical fiber 12 and that an objective lens 13 and an ocular 14 or a light detector 15 are provided to observe an immersed portion of an optical fiber in an etch solution. In this state, if etching is conducted, in an early stage, light propagates through the inside of the core of an optical fiber and emits from an end face, as shown in FIG. 5A. If the etching reaches the core however, a waveguide function is lost, so that, light begins to leak through an entire exposed portion of the core as shown in FIG. 5B, giving bright luminosity. If the etching advances further, the core portion disappears with a result that light is emitted through a sharpened tip downward as shown in FIG. 5C and the sight through the objective lens 13 becomes dark again. In this manner, the start and end of core etching can be monitored depending on the change of light emission from the immersed optical fiber in the etch solution.

FIGS. 6A–6B show examples of etching the core portion accurately by monitoring a start of core etching as above. FIG. 6A shows an example in which, when starting core portion etching, the moving speed of the optical fiber is changed to form only the core portion 21 into a large taper angle with respect to the clad portion 22. FIG. 6B shows an example in which the core 21 taper angle is given first a large shape and finally a small and sharp shape. It is known that in the scanning proximity field optical microscope the light propagation efficiency at an optical probe tip is largely influenced by even a slight change in the tip form. The form control with such accuracy is effective in obtaining a high transmission efficiency of optical probe.

Although etch start on the core portion is visibly determined, it can also be implemented through the steps in which detection is made by the light detector 15, direct input is made to the fine movement control means 9 and automatic switching is made to a predetermined operation speed.

The probe thus manufactured is coated as required with a metal at its taper portion except for the tip by oblique deposition or the like, thereby being utilized as an optical probe. Meanwhile, if a laser beam is locally irradiated to cause plastic deformation giving a bent form, a probe for a scanning proximity field optical atomic force microscope can be formed.

Figure 7:
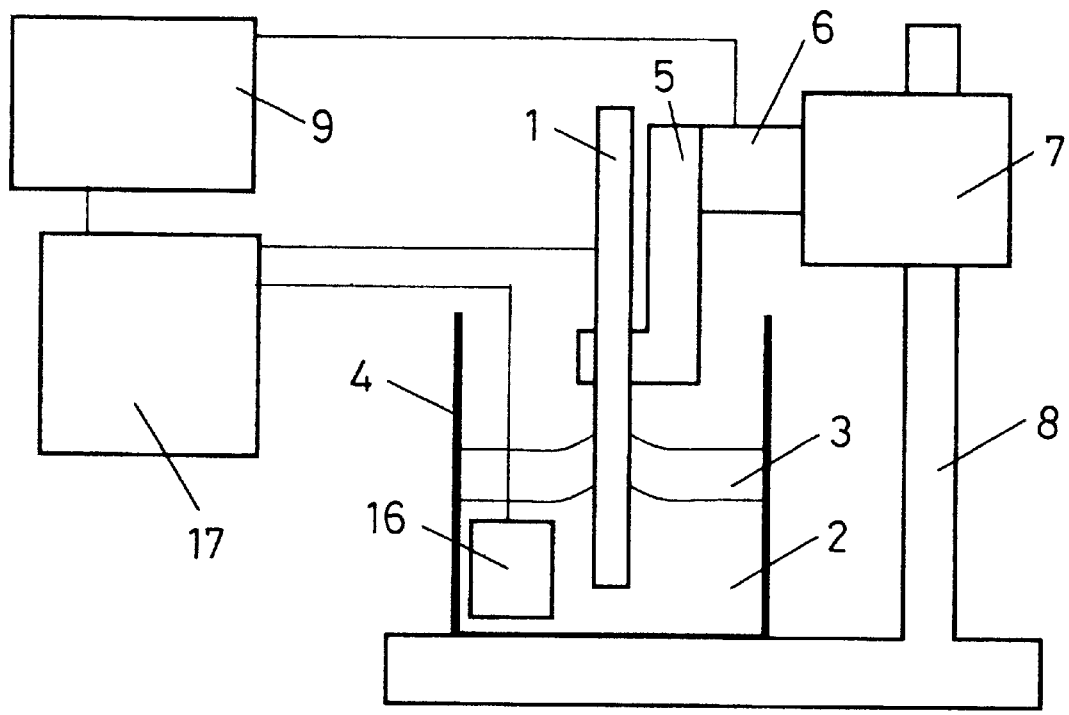
FIG. 7 is a typical view showing a structure of a jig used in the probe sharpening method of the present invention.

Now explained is a method to conduct electrolytic etching where the probe material is metal. FIG. 7 shows a structure of a jig for performing electrolytic etching. It is different from structure of FIG. 1 in that an opposite pole 16 and a voltage applying means 17 are provided. The voltage applying means 17 applies a voltage between the probe material 1 and the opposite pole 16, thereby advancing etching. In this case, etching advancement can be monitored depending on a change of current caused by voltage application. Based on this the moving speed is changed, and the tip form can be controlled.

Figure 8:
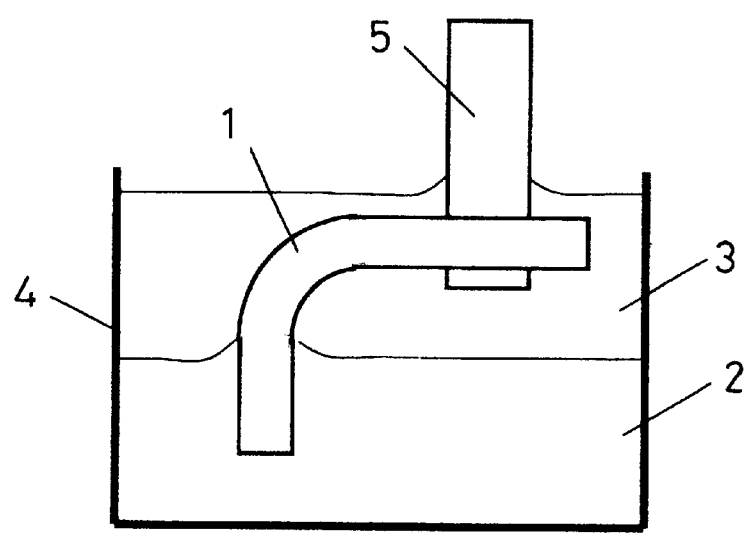
FIG. 8 is a typical view showing one arrangement example in the probe sharpening method of the present invention.

In the present embodiment, straight line forms of probe materials have basically been discussed. Alternatively, if a straight line form of probe is bent after etching, a probe utilizable for APH can be manufactured. As a bending method, a plastic deformation can be caused by locally irradiating a laser beam. It is also possible to etch on a probe material previously bent as shown in FIG. 8.

Figure 9A:
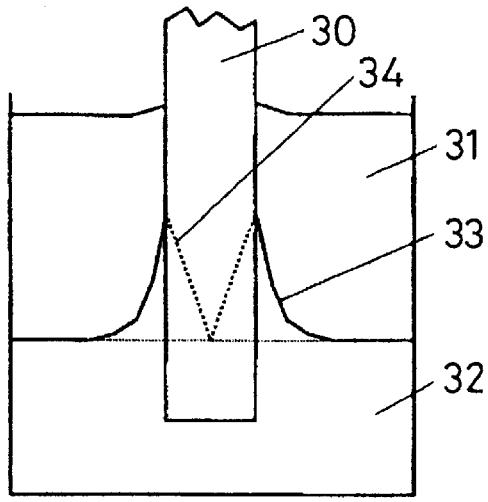
FIGS. 9A–9E show a sharpening process to obtain a large tip angle according to the present invention.
Figure 9B:
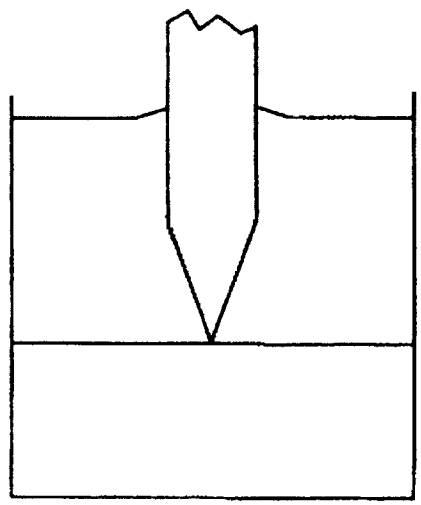
Figure 9C:
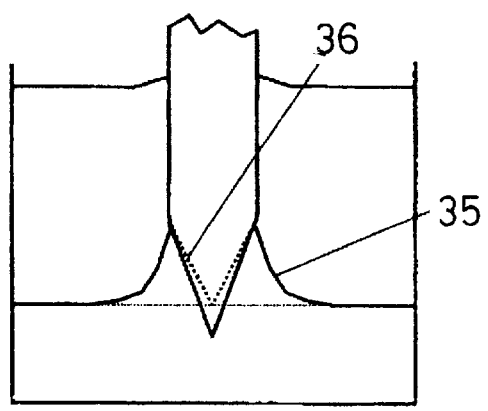
Figure 9D:
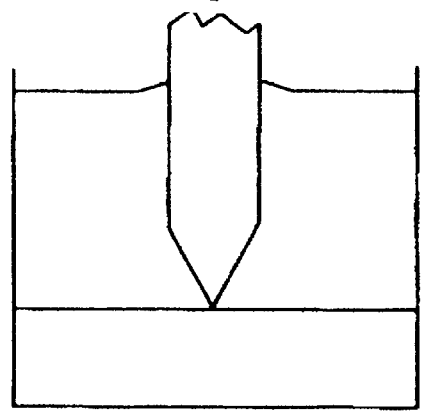
Figure 9E:
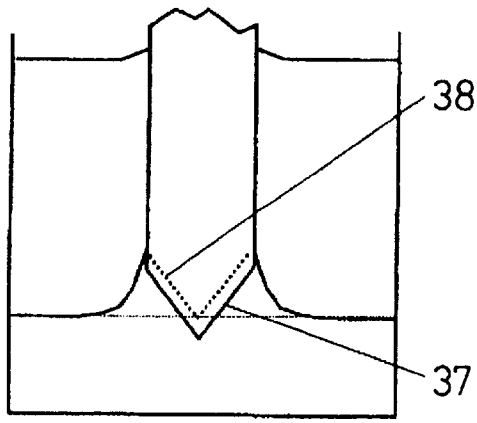

Finally, explanation is made on a method to conduct repeated stationary etchings in order to increase the tip angle maximally. FIG. 9A shows a state in which an optical fiber 30 is inserted into an interface of an organic solvent 31 and a hydrogen fluoride solution 32. Here, because the optical fiber has a hydrophilic surface, a meniscus 33 is formed. In this case, if etching advances, the optical fiber is etched in a portion at and below a wave line 34 as shown, thereby being formed with a taper as shown in FIG. 9B. If from this state a taper tip of the optical fiber is further inserted slightly into the hydrogen fluoride solution 32, a new meniscus 35 is created as shown in FIG. 9C. The height of the meniscus varies depending on the diameter and angle of the optical fiber inserted. In this case, the height of meniscus 35 is lower than the height of the first meniscus 33 corresponding to a reduction in diameter. In this state, it etching advances, the optical fiber is etched in a portion at and below a wave line 36 as shown, thereby being formed with a taper as shown in FIG. 9D. If this process is repeated a certain number of times, a meniscus 36 reaches an unetched portion in the periphery of an optical fiber as shown in FIG. 9E. Thus, a pre-etching tip taper portion 37 and a after-etching tip taper portion shown by a wave line 38 are only moved in parallel, converging into a constant taper angle. This angle is different depending on the kind of organic solvent. With a highly hydrophobic organic solvent, hydrogen fluoride has a high meniscus resulting in a large limit taper angle. In a converse case, the limit taper angle can be given small, In this manner, the probe is partly immersed in a a liquid disposed in a vessel and having at least two lauers including an etch solution for a probe material and a non-etch solution lower in specific gravity than the etch solution and immiscible therewith. After sharpening a tip, the sharpened tip is again inserted into the etch solution. Thus a probe with a large tip angle can be manufactured. By repeating the insertion of the tip into the etch solution, the tip angle can be increased to a limit angle. This method allows the position of the probe to be manually changed, which can be considered as a simple method to obtain a large tip angle.

By virtue of the probe sharpening method of the present invention, the probe for STM or AFM can be stably formed with a tip sharpened more than that of the conventional. Thus a probe for high resolution observation can be provided. Meanwhile, an optical probe for SNOM capable of high sensitivity observation and having high transmission efficiency can be provided by increasing the tip taper angle. For SNOM probes requiring a reduced taper angle, a probe can be provided which is capable of obtaining a geosetrical image with high resolution.

What is claimed is:

1. In a method for manufacturing a probe having a sharpened tip by immersing one part of a probe preform in a liquid disposed in a container and having at least two liquid layers including an etch solution for etching the probe preform and a non-etch solution which is lower in specific gravity than that of the etch solution and which is immiscible with the etch solution, the step of: moving the probe preform in the etch and non-etch solutions during etching along a longitudinal axis of the probe preform and at a speed which does not exceed a taper length forming speed for a probe preform which is not moved in the etch and non-etch solutions during etching to thereby etch an end of the part of the probe preform into a sharp tapered tip having a taper angle greater than that obtained for a probe preform which is not moved during etching.

2. A method according to claim 1; wherein the probe preform is cylindrical in shape and the longitudinal axis of the probe preform comprises a central longitudinal axis; and wherein the moving step comprises moving the probe preform so that the central longitudinal axis thereof is disposed vertically with respect to a surface of the etch solution.

3. A method according to claim 1; wherein the moving step comprises moving the probe preform in a substantially continuous movement.

4. A method according to claim 1; wherein the moving step comprises moving the probe preform at a variable moving speed.

5. In a method for manufacturing a probe having a sharpened tip by immersing one part of a probe preform in a liquid disposed in a container and having at least two liquid layers including an etch solution for etching the probe preform and a non-etch solution which is lower in specific gravity than that of the etch solution and which is immiscible with the etch solution, the step of: moving the probe preform along a longitudinal axis thereof in both upward and downward directions relative to a surface of the etch solution to thereby etch an end of the part of the probe preform into a sharp tapered tip having a preselected taper angle.

6. A method according to claim 1; wherein the probe preform is made of metal.

7. A method according to claim 6; wherein the etch solution is selected from the group consisting of hydrogen fluoride, sulfuric acid, nitric acid, hydrochloric acid, aqua regia, phosphoric acid, iodine, iodide and a hydroxide; and wherein the non-etch solution is selected from the group consisting of an organic solvent, mineral oil, vegetable oil and chemical synthetic oil.

8. A method according to claim 1; wherein the probe preform is made of glass.

9. A method according to claim 8; wherein the etch solution comprises a solution selected from the group consisting of a hydrogen fluoride solution and a mixture solution of fluorine and ammonium fluoride; and wherein the non-etch solution comprises a solution selected from the group consisting of an organic solvent, mineral oil, vegetable oil and chemical synthetic oil.

10. A method according to claim 1; wherein the probe preform is made of plastic.

11. A method according to claim 10; wherein the etch solution includes a compound selected from the group consisting of an aromatic hydrocarbon, a hydrocarbon halide or a mixture of a hydrophobic liquid containing an aromatic hydrocarbon and a hydrocarbon halide, the hydrocarbon halide having a specific gravity greater than that of water at the same temperature; and wherein the non-etch solution comprises water.

12. In a method for manufacturing a probe having a sharpened tip by immersing one part of an optical fiber in a liquid disposed in a container and having at least two liquid layers including an etch solution for etching the optical fiber and a non-etch solution which is lower in specific gravity than that of the etch solution and which is immiscible with the etch solution, the steps of: moving the optical fiber along a longitudinal axis thereof in both upward and downward directions relative to a surface of the etch solution to thereby etch an end of the part of the optical fiber into a sharp tapered tip having a preselected taper angle; and introducing light during etching into the optical fiber from an end opposite the etched end thereof for monitoring the etching advancement in accordance with a change in an emission state from the optical fiber in the etch solution.

13. A method according to claim 12; further comprising the step of varying a moving speed of the optical fiber at the start of etching of a core portion of the optical fiber.

14. A method according to claim 6; further comprising the step of accelerating etching of the probe preform by applying a voltage between the probe preform and an opposite pole disposed in the etch solution.

15. A method according to claim 14; further comprising the step of varying a moving speed of the probe preform in accordance with a change of current due to the voltage application.

16. In a method for manufacturing a probe having a sharpened tip by immersing one part of a probe preform in a liquid disposed in a container and having at least two liquid layers including an etch solution for etching the probe preform and a non-etch solution which is lower in specific gravity than that of the etch solution and which is immiscible with the etch solution, the steps of: moving the probe preform into the etch and non-etch solutions during etching along a longitudinal axis of the probe preform and at a speed which does not exceed a taper length forming speed for a probe preform which is not moved in the etch and non-etch solutions during etching to thereby etch an end of the part of the probe preform into a sharp tapered tip having a taper angle greater than that obtained for a probe preform which is not moved during etching; and reinserting the sharp tapered tip of the probe into the etch solution to further etch the sharp tapered tip.

17. A method according to claim 16; wherein the reinserting step comprises repeatedly reinserting the sharp tapered tip of the probe into the etch solution.

18. A method according to claim 6; wherein the etch solution comprises a combination of two or more of hydrogen fluoride, sulfuric acid, nitric acid, hydrochloric acid, aqua regia, phosphoric acid, iodine, iodide and a hydroxide; and wherein the non-etch solution is selected from the group consisting of an organic solvent, mineral oil, vegetable oil or chemical synthetic oil.

19. A method for sharpening a probe, comprising the steps of: providing a probe preform having a longitudinal axis; at least partially immersing the probe preform in a mixture containing at least an etch solution; and moving the probe preform in the etch solution along the longitudinal axis thereof during etching at a speed which does not exceed a taper length forming speed for a probe preform which is not moved in the etch solution during etching to thereby etch an end of the probe preform into a sharp tapered tip having a taper angle greater than that obtained for a probe preform which is not moved during etching.

20. A method according to claim 19; wherein the immersing step comprises immersing the probe preform in a mixture containing the etch solution and a non-etch solution having a lower specific gravity than and which is not miscible with the etch solution.

21. A method according to claim 19; wherein the moving step comprises moving the probe preform in a downward direction relative to a surface of the etch solution.

22. A method according to claim 19; wherein the moving step comprises moving the probe preform in both upward and downward directions relative to a surface of the etch solution.

23. A method according to claim 19; wherein the moving step comprises continuously moving the probe preform until the end of the probe preform is etched into the sharp tapered tip.

24. A method according to claim 19; wherein the moving step comprises moving the probe preform at a variable moving speeds.

25. A method according to claim 19; wherein the probe preform comprises an optical fiber.

26. A method according to claim 19; further comprising the steps of introducing light during etching into an end of the optical fiber opposite to the etched end; and monitoring the etching advancement in accordance with a change in an emission state from the optical fiber in the etch solution.

27. A method according to claim 19; further comprising the step of accelerating etching of the probe preform by applying a voltage between the probe preform and an opposite pole disposed in the etch solution.

* * * * *